United States Patent
Nedelman (10) Patent No.: US 9,643,561 B2
(45) Date of Patent: May 9, 2017

(54) OVERHEAD SIDE AIR CURTAIN PROTECTIVE BARRIER

(71) Applicant: Ford Global Technologies, LLC, Dearborn, MI (US)

(72) Inventor: Marc David Nedelman, Waterford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/855,843

(22) Filed: Sep. 16, 2015

(65) Prior Publication Data

US 2017/0072895 A1    Mar. 16, 2017

(51) Int. Cl.
*B60R 21/232* (2011.01)
*B60R 21/214* (2011.01)
*B60R 21/231* (2011.01)

(52) U.S. Cl.
CPC .......... *B60R 21/232* (2013.01); *B60R 21/214* (2013.01); *B60R 21/23138* (2013.01)

(58) Field of Classification Search
CPC .... B60R 21/213; B60R 21/214; B60R 21/232
See application file for complete search history.

(56) References Cited

U.S. PATENT DOCUMENTS

| | | | |
|---|---|---|---|
| 5,452,913 A | 9/1995 | Hansen et al. | |
| 6,224,091 B1* | 5/2001 | Eyrainer | B60R 21/213 280/730.2 |
| 6,733,035 B2* | 5/2004 | Thomas | B60R 21/232 280/730.2 |
| 7,380,815 B2* | 6/2008 | Rose | B60R 21/213 280/728.2 |
| 7,686,331 B2 | 3/2010 | Li et al. | |
| 7,770,925 B2 | 8/2010 | Seymour et al. | |
| 8,091,917 B2* | 1/2012 | Weyrich | B60R 21/237 280/728.2 |
| 9,067,564 B2* | 6/2015 | Kemp | B60R 21/231 |
| 2002/0175502 A1* | 11/2002 | Tesch | B60R 21/232 280/730.2 |

(Continued)

FOREIGN PATENT DOCUMENTS

| DE | 102016003137 A | 10/2016 |
|---|---|---|
| EP | 1698523 | 9/2006 |

(Continued)

OTHER PUBLICATIONS

GB Search Report dated Jan. 25, 2017 (5 pages).

*Primary Examiner* — James English
(74) *Attorney, Agent, or Firm* — Frank A. MacKenzie; Bejin Bieneman PLC (57) ABSTRACT

An air curtain assembly includes a side air curtain having a top edge and being inflatable from an uninflated position to an inflated position. In the uninflated position, the side air curtain extends along a longitudinal axis. A first flap is attached to the top edge and an elongated flap is attached to the first flap. The elongated flap extends from the first flap at an angle relative to the longitudinal axis. As such, as the air curtain inflates from the uninflated position to the inflated position, the elongated flap is disposed between the side air curtain and a side roof rail of the vehicle to limit or prevent abrasion of the side air curtain as the side air curtain is inflated.

20 Claims, 6 Drawing Sheets

(56) References Cited

U.S. PATENT DOCUMENTS

| | | | |
|---|---|---|---|
| 2005/0134029 A1 | 6/2005 | Noguchi et al. | |
| 2006/0202452 A1 | 9/2006 | Breed et al. | |
| 2011/0248484 A1* | 10/2011 | Scott | B60R 21/213 280/730.2 |
| 2014/0265266 A1* | 9/2014 | Kemp | B60R 21/231 280/728.2 |
| 2015/0115575 A1* | 4/2015 | Jovicevic | B60R 21/213 280/728.2 |

FOREIGN PATENT DOCUMENTS

| | | | |
|---|---|---|---|
| JP | 2006273330 A | 10/2006 |
| KR | 1020090120027 A | 11/2009 |
| WO | 2013133548 A1 | 9/2013 |

* cited by examiner

OVERHEAD SIDE AIR CURTAIN PROTECTIVE BARRIER

BACKGROUND

A vehicle may include a passive occupant restraints, including airbags and air curtains. One type of passive occupant restraint is a side air curtain, which is mounted to a frame of the vehicle above a passenger compartment. Specifically, the vehicle may include a headliner above the passenger compartment, and the side air curtain may be mounted above the headliner. When a vehicle impact is sensed, the side air curtain may be inflated. When inflated, the side air curtain extends downwardly from the headliner and may extend along doors and/or side pillars of the vehicle to cushion impact between an occupant and the doors and/or side pillars.

The side air curtain is inflated rapidly in response to a vehicle impact. During this rapid inflation, the side air curtain may forcefully contact and/or rub against other components of the vehicle, e.g., the frame of the vehicle. The frame may include pointed edges, burrs, etc. For example, in a frame that is formed of aluminum, the components of the frame may be connected, at least in part, with fasteners, such as flow drill screws, which may include pointed ends. As another example, in a frame that is formed of steel, the components of the frame may be connected, at least in part, by welding, which may form burrs.

Additionally, the design of the side air curtain is subject to several logistical constraints, such as packaging constraints, manufacturing constraints, vehicle assembly constraints, cost constraints, etc.

There remains an opportunity to design a side air curtain assembly that satisfies these logistical constraints while minimizing contact with pointed edges, burrs, etc., on the vehicle frame.

DETAILED DESCRIPTION

Figure 1:
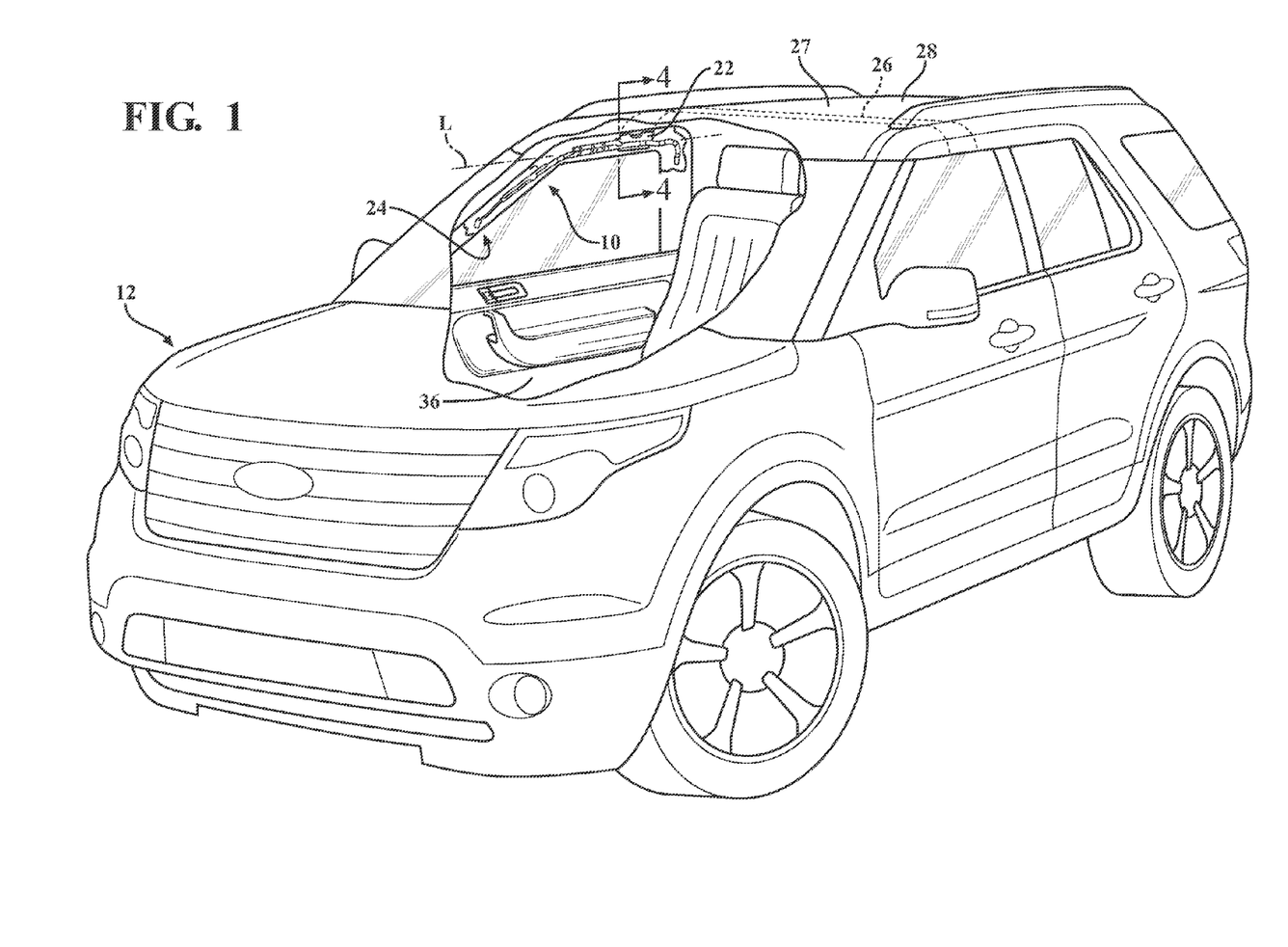
FIG. 1 is a perspective view of a vehicle including a side air curtain assembly mounted to a side roof rail of the vehicle.
Figure 2:
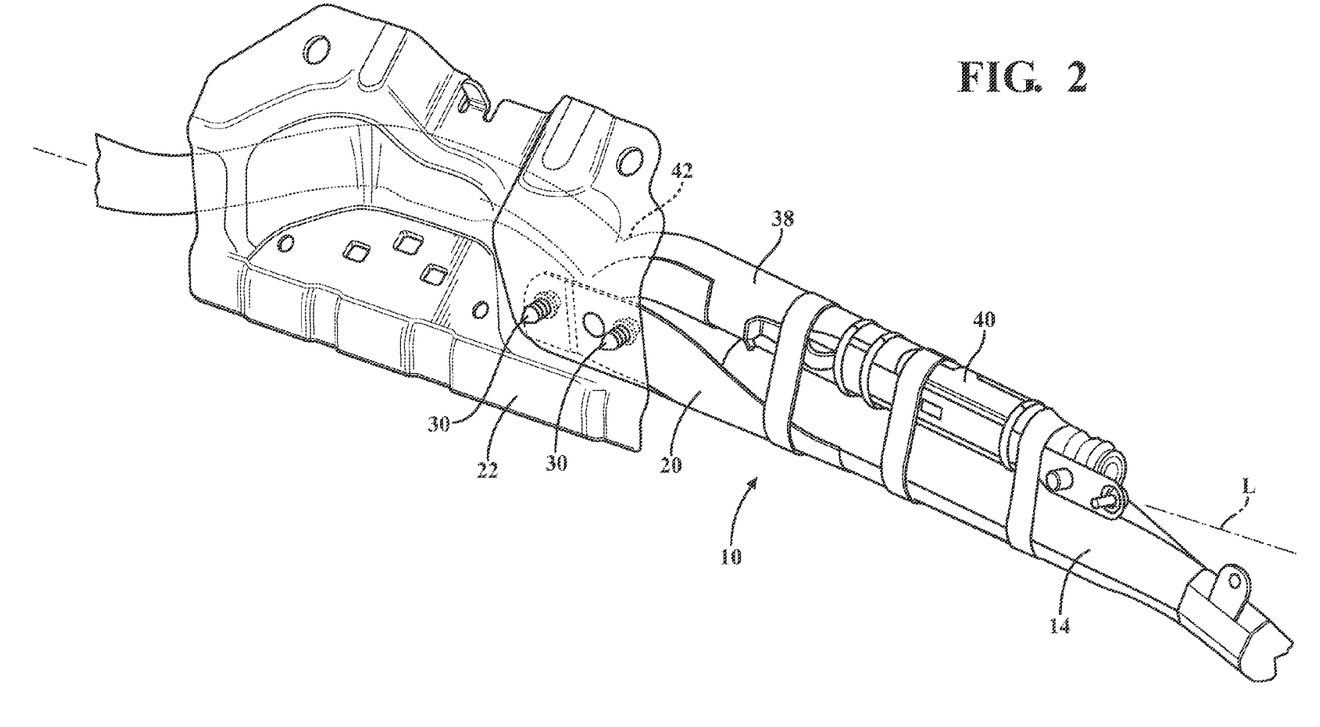
FIG. 2 is a perspective view of the side air curtain assembly and a portion of the side roof rail.
Figure 4:
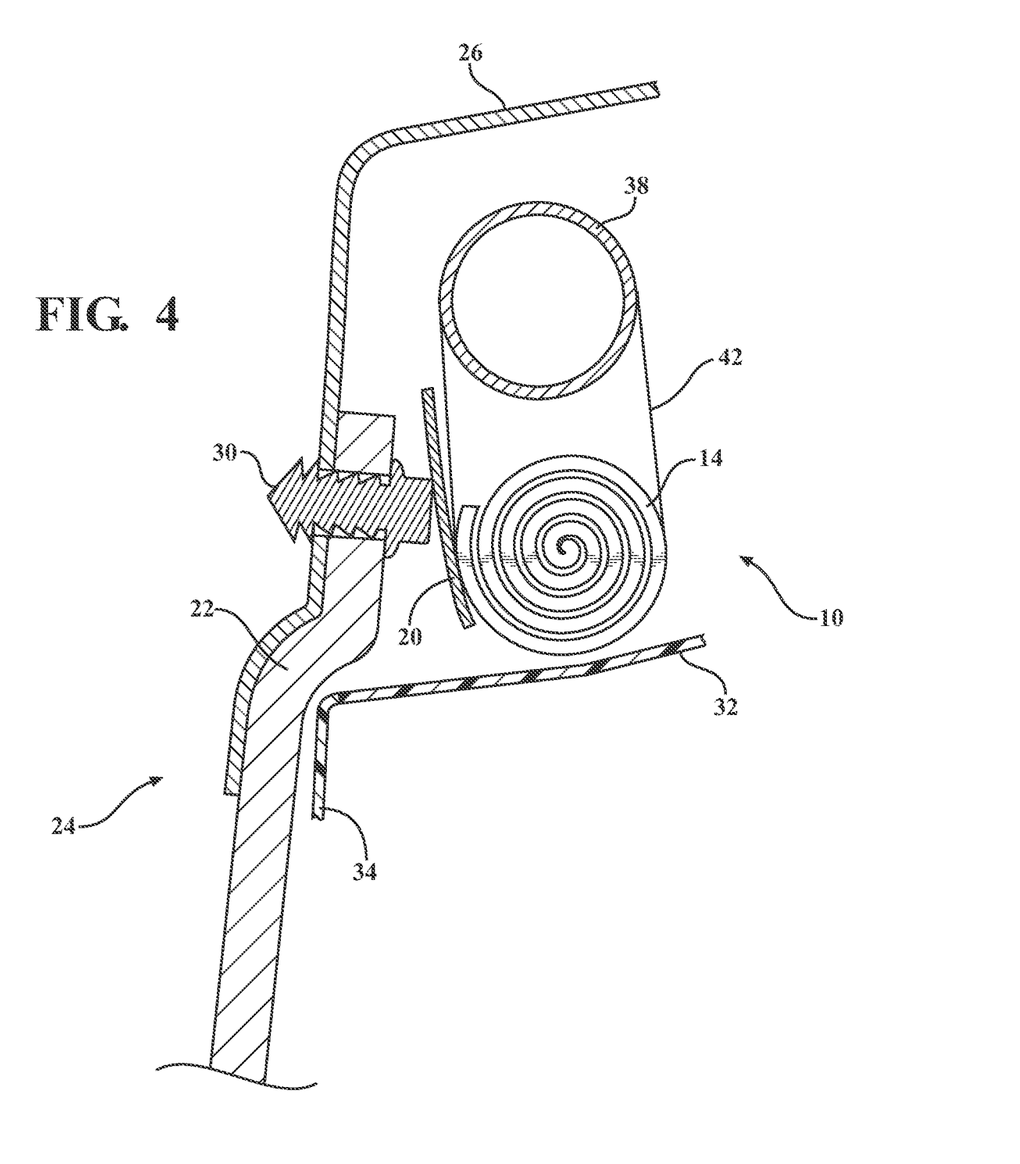
FIG. 4 is a partial cross-sectional view of the side air curtain assembly and the side roof rail through line 5 of FIG. 1.
Figure 5:
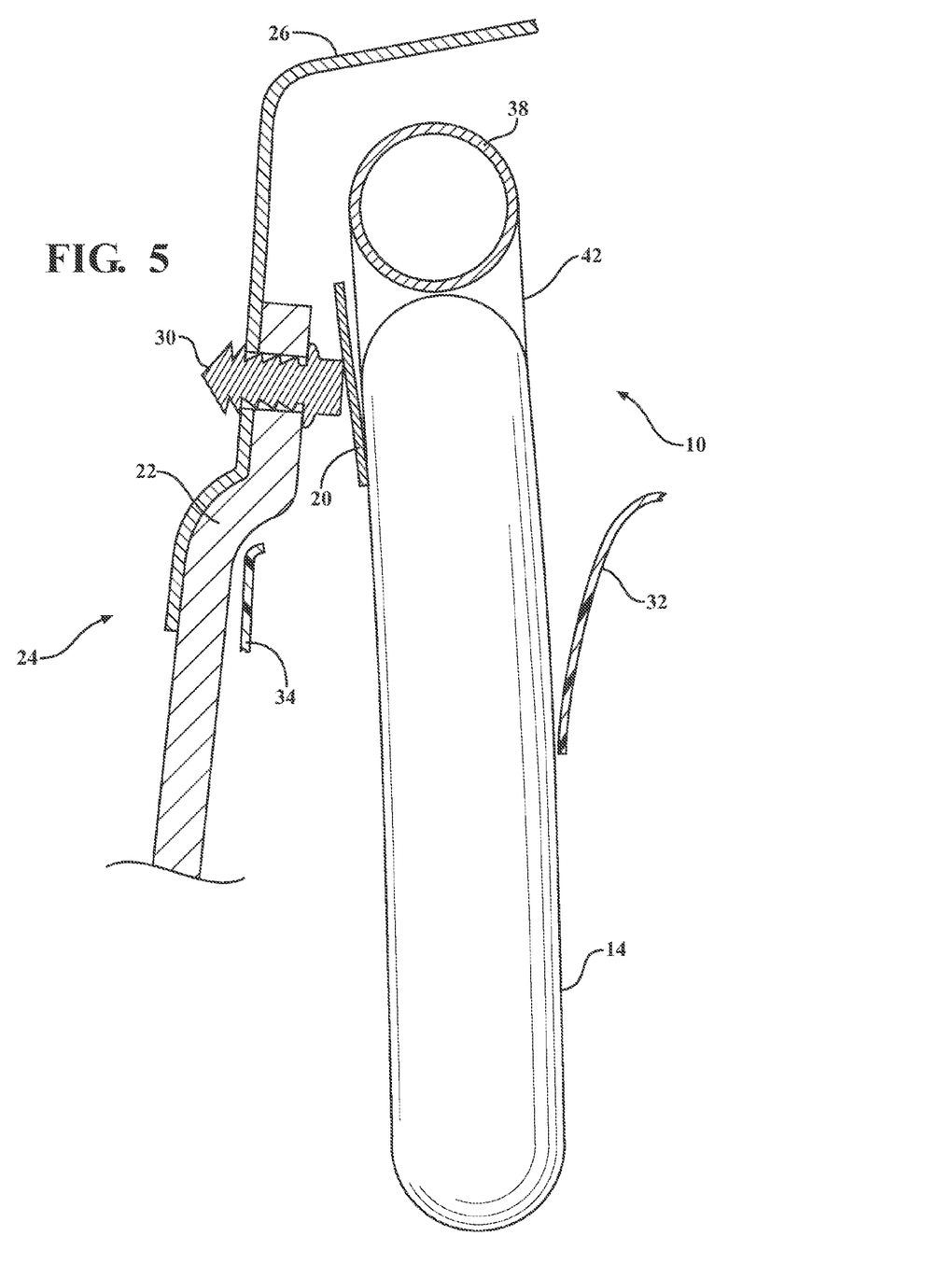
FIG. 5 is the cross-sectional view of FIG. 4 with the side air curtain in an inflated position.

With reference to the Figures, wherein like numerals indicate like parts throughout the several views, a side air curtain assembly 10 for a vehicle 12 may include a side air curtain 14. The side air curtain 14 may include a top edge 16 and the side air curtain 14 may be inflatable from an uninflated position, as shown in FIGS. 1, 2, and 4, to an inflated position, as shown in FIG. 5. The side air curtain 14 in the uninflated position extends along a longitudinal axis L. The side air curtain assembly 10 include a first flap 18 attached to the top edge 16 of the side air curtain 14 and an elongated flap 20 that is attached to the first flap 18 and that extends from the first flap 18 at an angle, i.e., a non-zero degree angle, relative to the longitudinal axis L.

Because the elongated flap 20 extends at an angle from the first flap 18 relative to the longitudinal axis L, the elongated flap 20 is positioned to be disposed between the side air curtain 14 and the vehicle 12, e.g., a side roof rail 22 of the vehicle 12, when the side air curtain 14 is inflated. Specifically, as the side air curtain 14 is inflated, the side air curtain 14 may move toward the side roof rail 22. During this movement, the elongated flap 20, being positioned between the side air curtain 14 and the side roof rail 22, limits and/or eliminates rubbing of the side air curtain 14 against the side roof rail 22, and potential abrasion of the side air curtain 14 by the side roof rail 22. In other words, the first flap 18 acts as a protective barrier for the side air curtain 14. In addition, the first flap 18 may guide the side air curtain 14 away from a trim panel 34 as the side air curtain 14 inflates to the inflated position to prevent the side air curtain 14 from inflating behind the trim panel 34. In other words, the first flap 18 may act as a ramp for the side air curtain 14.

With reference to FIG. 1, the vehicle 12 includes a frame 24, including the side roof rail 22, a roof cross-member 26, etc., and exterior panels 27 supported by the frame 24, e.g., a roof panel 28. The roof cross-member 26 and/or the roof panel 28 may be connected to the side roof rail 22 with one or more fasteners 30. The fasteners 30 may be screws, such as flow drill screws, bolts, or any other suitable fasteners 30. As a result of the assembly of the fastener 30, the fastener 30 may present a sharp edge adjacent the side air curtain assembly 10. For example, a head and/or shaft of the fastener 30 may present the sharp edge and may be disposed adjacent the side curtain airbag assembly. As an example, FIGS. 4 and 5 show the fastener 30, specifically the flow drill screw, connecting the roof cross-member 26 to the side roof rail 22.

The frame 24 and the exterior panels 27 may be formed of any suitable material. For example, the frame 24 and/or the exterior panels 27 may be formed of aluminum. In this configuration, the fasteners 30, e.g., flow drill screws, may be used to fix together components of the frame 24 and/or the exterior panels 27. The fasteners 30 may fix together components of the frame 24 and/or the exterior panels 27 in addition to, or in the alternative to welding.

With continued reference to FIGS. 4 and 5, the vehicle 12 may include a headliner 32 adjacent to the side roof rail 22, and a trim panel 34 extending in a direction away from the headliner 32. Specifically, the headliner 32 extends generally horizontally above a passenger compartment 36 of the vehicle 12 and the trim panel 34 extends downwardly and generally vertically from the headliner 32. The headliner 32 may be formed of any suitable material such as a polymer, e.g., foam, plastic, etc. The trim panel 34 may be formed of any suitable material such as a polymer, e.g., nylon, acrylonitrile butadiene styrene (ABS), vinyl, etc.

With reference again to FIG. 2, and as set forth above, the side air curtain 14 may extend along the longitudinal axis L when the side air curtain 14 is in the uninflated position. Specifically, the side air curtain 14 may be wound around the longitudinal axis L and/or bunched about the longitudinal axis L. The longitudinal axis L generally extends in a vehicle 12 fore-aft direction. As shown in FIG. 2, since the elongated flap 20 extends at an angle relative to the longitudinal axis L, the elongated flap 20 is wound around the side air curtain 14, i.e., in a generally spiral direction about the side air curtain 14, when the side air curtain 14 is in the uninflated position.

The side air curtain 14 defines an inflation chamber (not numbered). The side air curtain 14 may include a duct 38 in communication with the inflation chamber and connected to an inflator 40, as described further below. The duct 38 may extend from the top edge 16 of the side air curtain 14 at an angle relative to the longitudinal axis L. Specifically, the duct 38 extends from the top edge 16 of the side air curtain 14 at a Y-joint 42. The duct 38, and the Y-joint 42, may be aligned with one of the fasteners 30, as best shown in FIGS. 2, 4, and 5. Since the duct 38 and the Y-joint 42 connect the inflator 40 to the inflation chamber, inflation medium at a high pressure may flow from the inflator 40 through the duct 38 and the Y-joint 42 to the inflation chamber. As shown in FIG. 5, the elongated flap 20 disposed between the pressurized duct 38 and the Y-joint 42 to restrict contact by the duct 38 and/or Y-joint 42 against the fastener 30.

Figure 3:
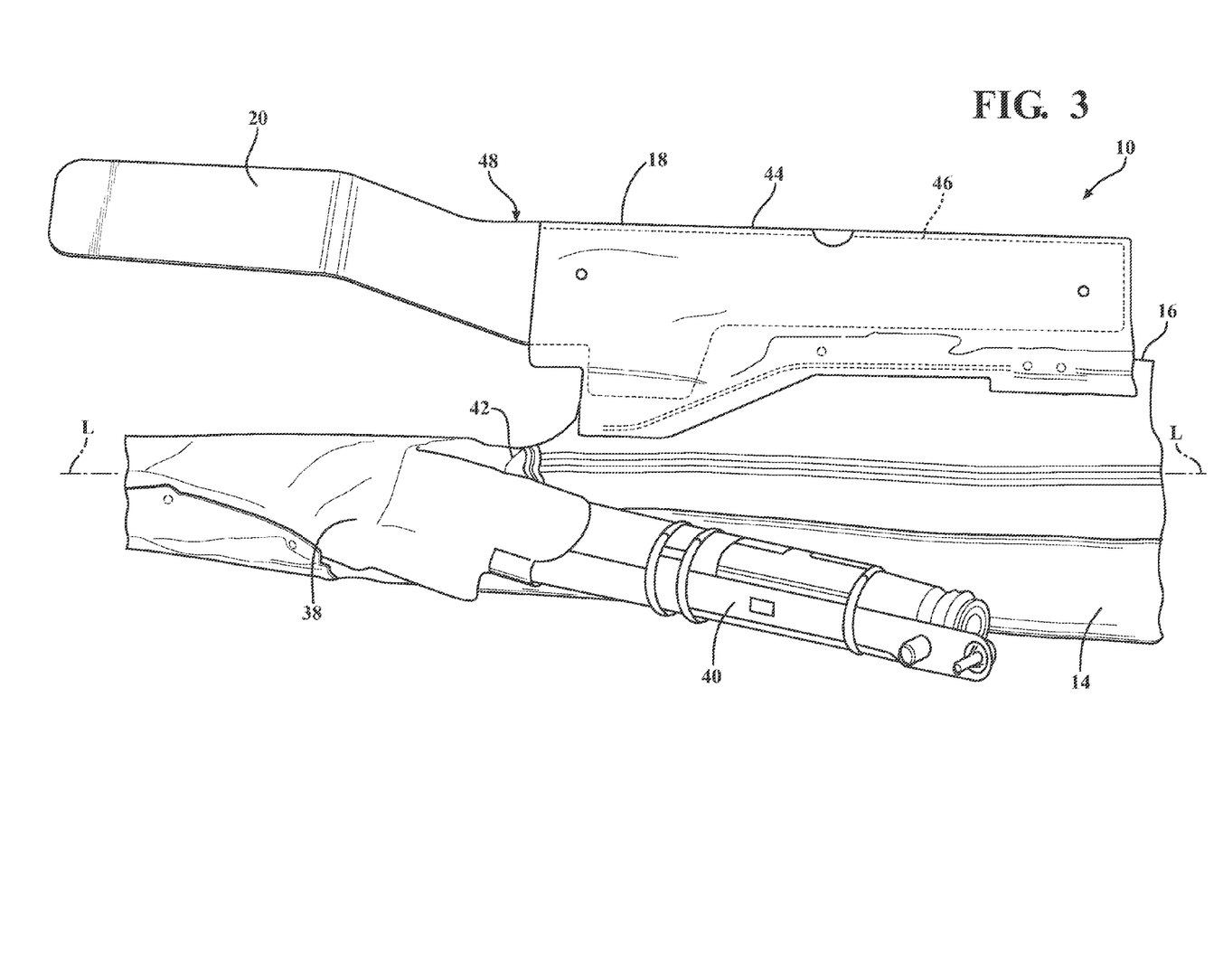
FIG. 3 is a perspective view of the side air curtain assembly with an inflator folded to illustrate a top edge of an air curtain, a first flap connected to the top edge, and an elongated flap extending from the first flap.

With reference to FIGS. 3-5, the top edge 16 of the side air curtain 14 is disposed above the rest of the side air curtain 14 when the side air curtain 14 is in the inflated position, as shown in FIG. 5. The top edge 16 extends along the longitudinal axis L, i.e., in a fore-aft vehicle 12 direction. With reference to FIG. 3, when the side air curtain 14 is in the uninflated position, the first flap 18 extends longitudinally along the longitudinal axis L, and the elongated flap 20 extends at an angle relative to the longitudinal axis L, i.e., transversely to the longitudinal axis L.

The side air curtain assembly 10 may be mounted to the vehicle 12 in any suitable fashion. For example, the side air curtain 14 and/or the inflator 40 may be mounted to the frame 24, e.g., the side roof rail 22.

The side air curtain 14 may be formed of any suitable type of material, e.g., from a woven polymer. For example, the side air curtain 14 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

As set forth above, the first flap 18 is attached to the top edge 16 of the side air curtain 14, as best shown in FIG. 3. It should be appreciated that FIG. 3 illustrates the side air curtain assembly 10 disconnected from the vehicle 12 with the inflator 40 moved aside to show the attachment of the first flap 18 to the top edge 16 of the side air curtain 14.

The first flap 18 may include a fabric sleeve 44 and an insert 46 disposed in the fabric sleeve 44. The fabric sleeve 44 is fixed to the top edge 16 of the side air curtain 14. For example, the fabric sleeve 44 may be stitched to the side air curtain 14 at the top edge 16, as best shown in FIG. 3. Alternatively, for example, the fabric sleeve 44 may be integrally formed with the side air curtain 14, i.e., simultaneously formed as a single unit. The fabric sleeve 44 may be formed of the same type of material as the side air curtain 14 or, alternatively, may be formed of a different type of material than the side air curtain 14.

The elongated flap 20 and the insert 46 may be fixed together to form a panel 48. Specifically, the elongated flap 20 may extend from the insert 46. For example, the elongated flap 20 and the insert 46 may be integral, i.e., simultaneously formed as a single unit. Alternatively, for example, the elongated flap 20 and the insert 46 may be formed separately and subsequently attached together, e.g., by welding, adhesive, fusing, bonding, etc.

The first flap 18 may be sealed from fluid communication with the inflation chamber. In other words, the first flap 18 is not inflated by the inflator 40 when the inflator 40 fills the side air curtain 14 from the uninflated position to the inflated position.

The side air curtain assembly 10 may include a means for extending from the first flap 18 between the fastener 30 and the side air curtain 14 in the inflated position. For example, these means may include the first flap 18 and/or the elongated flap 20, and structural equivalents thereof. Specifically, at least one of the first flap 18 and the elongated flap 20 is configured to guide the side air curtain 14 from the uninflated position to the inflated position. For example, the elongated flap 20 extends from the first flap 18 between the fastener 30 and the side air curtain 14 when the side air curtain 14 is in the inflated position. As such, the elongated flap 20 directs the side air curtain 14 away from the fastener 30 to reduce the likelihood that the side air curtain 14 contacts the fastener 30 and is damaged by the fastener 30, e.g., scratched, punctured, etc., by the fastener 30.

As set forth above, in addition to guiding the side air curtain 14 away from the fastener 30, the first flap 18 and/or the elongated flap 20 may guide the side air curtain 14 away from the trim panel 34 as the side air curtain 14 inflates to the inflated position to prevent the side air curtain 14 from inflating behind the trim panel 34.

As set forth above, the elongated flap 20 extends at an angle relative to the longitudinal axis L. Specifically, with reference to FIGS. 2 and 3, the elongated flap 20 extends from and is supported by the first flap 18. Specifically, the elongated flap 20 is cantilevered from the first flap 18 in the inflated position. The elongated flap 20 is spaced from the side air curtain 14. Specifically, the first flap 18 is disposed between the elongated flap 20 and the side air curtain 14.

The insert 46 and the elongated flap 20 may be formed of the same material. For example, the insert 46 and the elongated flap 20 may be formed of plastic, specifically, for example, olefinic thermoplastic elastomer, or any other suitable material.

In the alternative to the first flap 18 including the fabric sleeve 44 and the insert 46, it should be appreciated that the first flap 18 may be a one-piece unit, e.g., formed of the same type of material as the side air curtain 14 or formed of the same type of material as the elongated flap 20. In such a configuration, this one-piece first flap 18 may be connected to the top edge 16 of the side air curtain 14 in any suitable fashion described above, e.g., stitching, welding, adhering, etc.

As set forth above, the side air curtain assembly 10 includes the inflator 40. The inflator 40 is configured to inflate the side air curtain 14 from the uninflated position to the inflated position in response to a sensed impact, as described further below. The inflator 40 may be, for example, a pyrotechnic inflator that uses a chemical reaction to drive inflation medium into the inflation chamber. Alternatively, the inflator 40 may be of any suitable type, for example, a cold-gas inflator.

Figure 6:
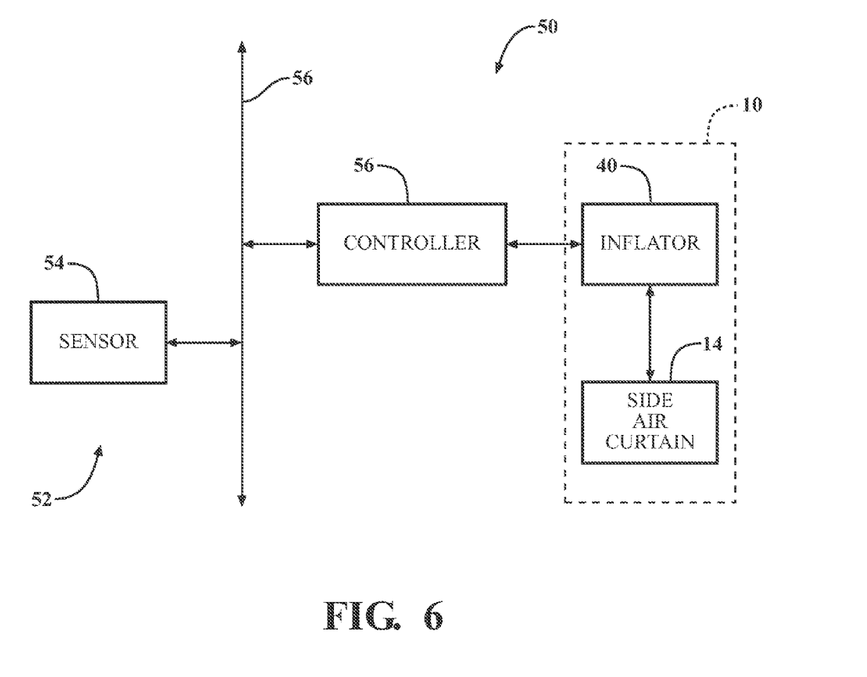
FIG. 6 is a schematic of a passive restraint system.

The side air curtain 14 may be a component of a passive restraint system 50, which is shown schematically in FIG. 6. The passive restraint system 50 includes an impact sensing system 52, which may include at least one impact sensor 54 for sensing impact of the vehicle 12. The impact sensor 54 is the only component of the impact sensing system 52 shown in FIG. 6, however, it should be appreciated that the impact sensing system 52 may include additional components not shown in FIG. 6.

The passive restraint system 50 may include a controller 56. The controller 56 and the sensor 54 may be connected to a communication bus 58, such as a controller 56 area network (CAN) bus, of the vehicle 12. The controller 56 may use information from the communication bus 58 to control the activation of the inflator 40. The inflator 40 may be connected to the controller 56, as shown in FIG. 6, or may be connected directly to the communication bus 58.

The controller 56 may be in communication with the sensor 54 and the inflator 40, directly or through the communication bus 58, for activating the inflator 40, e.g., for providing an impulse to a pyrotechnic charge of the inflator 40, when the sensor 54 senses an impact of the vehicle 12. Alternatively or additionally to sensing impact, the passive restraint system 50 may be configured to sense impact prior to impact, i.e., pre-impact sensing. The sensor 54 may be of any suitable type, e.g., using radar, lidar, and/or a vision system. The vision system may include one or more cameras, CCD image sensors, and/or CMOS image sensor 52, etc.

The controller 56 may be a microprocessor-based controller 56. The sensor 54 is in communication with the controller 56 to communicate data to the controller 56. Based on the data communicated by the sensor 54, the controller 56 instructs the inflator 40 to activate.

In operation, in response to an impact sensed by the sensor, the controller 56 may provide an instruction to the inflator 40 to inflate the side air curtain 14 from the uninflated position to the inflated position. As the side air curtain 14 inflates to the inflated position, the side air curtain 14 displaces the headliner 32 and/or the trim panel 34 to extend downwardly into the passenger compartment 36. As the side air curtain 14 inflates, the first flap 18 and the elongated flap 20 unroll, in which case the elongated flap 20 is disposed between the fastener 30 and the side air curtain 14 to reduce the likelihood of the side air curtain 14 rubbing against the fastener 30 as the side air curtain 14 inflates toward the inflated position and while the side air curtain 14 is in the inflated position, as set forth above. As also set forth above, as the side air curtain 14 inflates from the uninflated position to the inflated position, the first flap 18 and/or the elongated flap 20 guide the side air curtain 14 over the trim panel 34, i.e., toward the passenger compartment 36, to prevent the side air curtain 14 from inflating behind the trim panel 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An air curtain assembly comprising:
   a side air curtain including a top edge and being inflatable from an uninflated position to an inflated position, the side air curtain in the uninflated position extending along a longitudinal axis;
   a first flap attached to the top edge; and
   an elongated flap attached to the first flap and extending from the first flap at an angle relative to the longitudinal axis, the elongated flap being wound around the side air curtain in the uninflated position.

2. The side air curtain assembly as set forth in claim 1 wherein the first flap includes an insert and a fabric sleeve.

3. The side air curtain assembly as set forth in claim 2 wherein the elongated flap extends from the insert.

4. The side air curtain assembly as set forth in claim 2 wherein the insert is integral with the elongated flap.

5. The side air curtain assembly as set forth in claim 4 wherein the insert and the elongated flap are formed of plastic.

6. The side air curtain assembly as set forth in claim 1 the first flap is stitched to the top edge.

7. The side air curtain assembly as set forth in claim 1 wherein at least one of the first flap and the elongated flap is configured to guide the side air curtain from the uninflated position to the inflated position.

8. The side air curtain assembly as set forth in claim 1 further comprising an inflator contacting the first flap, the side air curtain defining an inflation chamber in fluid communication with the inflator.

9. The side air curtain assembly as set forth in claim 8 wherein the first flap is sealed from fluid communication with the inflation chamber.

10. A side air curtain system, comprising:
    a vehicle side roof rail including a fastener;
    a side air curtain including a top edge, the side air curtain being inflatable from an uninflated position to an inflated position;
    a first flap attached to the top edge;
    an elongated flap attached to and extending from the first flap;
    the elongated flap being disposed between the side air curtain and the fastener in the inflated position; and
    an inflator contacting the first flap, the side air curtain defining an inflation chamber in fluid communication with the inflator, the first flap being sealed from fluid communication with the inflation chamber.

11. The side air curtain system as set forth in claim 10 wherein the side air curtain in the uninflated position extends along a longitudinal axis, and the elongated flap extends from the first flap at an angle relative to the longitudinal axis in the uninflated position.

12. The side air curtain system as set forth in claim 11 wherein at least one of the first flap and the elongated flap is configured to guide the side air curtain from the uninflated position to the inflated position.

13. The side air curtain system as set forth in claim 11 further comprising a headliner adjacent to the vehicle side roof rail and a trim panel extending in a direction away from the headliner, the first flap extending between the headliner and the trim panel in the inflated position.

14. The side air curtain system as set forth in claim 10 wherein the first flap includes an insert and a fabric sleeve, wherein the elongated flap extends from the insert.

15. The side air curtain system as set forth in claim 14 wherein the insert is integral with the elongated flap.

16. The side air curtain system as set forth in claim 14 wherein the insert and the elongated flap are formed of plastic.

17. The side air curtain system as set forth in claim 10 wherein the first flap is stitched to the top edge.

18. A side air curtain system, comprising:
    a vehicle side roof rail including a fastener;
    a side air curtain including a top edge, the side air curtain being inflatable from an uninflated position to an inflated position;
    a first flap attached to the top edge;
    an elongated flap attached to and extending from the first flap;
    the elongated flap being disposed between the side air curtain and the fastener in the inflated position; and
    an inflator, the side air curtain defining an inflation chamber in fluid communication with the inflator, the side air curtain including a duct in communication with the inflator, the duct forming a Y-joint at the top edge of the side air curtain, the elongated flap being disposed between the Y-joint and the fastener.

19. The side air curtain system as set forth in claim 18 wherein the side air curtain in the uninflated position extends along a longitudinal axis, and the elongated flap extends from the first flap at an angle relative to the longitudinal axis in the uninflated position.

20. The side air curtain system as set forth in claim 18 wherein at least one of the first flap and the elongated flap is configured to guide the side air curtain from the uninflated position to the inflated position.

* * * * *